May 26, 1925.  1,538,944

T. B. LASHAR ET AL

SILVER REENFORCED SILVER PLATED FLATWARE FOR TABLE USE

Filed Jan. 26, 1923

Inventors
Thomas B. Lashar
Thomas H. Lashar
by Seymour & Earle
attys

Patented May 26, 1925.

1,538,944

UNITED STATES PATENT OFFICE.

THOMAS B. LASHAR, OF FAIRFIELD, CONNECTICUT, AND THOMAS H. LASHAR, OF CHICAGO, ILLINOIS, ASSIGNORS TO ASSOCIATED SILVER CO., OF CHICAGO, ILLINOIS, A CORPORATION.

SILVER-REENFORCED SILVER-PLATED FLATWARE FOR TABLE USE.

Application filed January 26, 1923. Serial No. 614,982.

*To all whom it may concern:*

Be it known that we, THOMAS B. LASHAR, a citizen of the United States, residing at Fairfield, in the county of Fairfield and State of Connecticut, and THOMAS H. LASHAR, a citizen of the United States, residing at Chicago, in the county of Cook and State of Illinois, have invented a new and useful Improvement in Silver-Reenforced Silver-Plated Flatware for Table Use; and we do hereby declare the following, when taken in connection with the accompanying drawings and the characters of reference marked thereon, to be a full, clear, and exact description of the same, and which said drawings constitute part of this application, and represent in—

Figure 1:
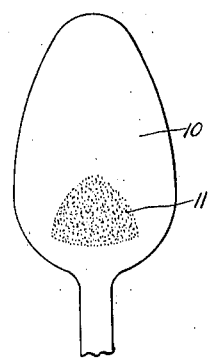

Fig. 1 a broken, underside, plan view of a spoon having a silver-reenforce applied in acordance with our invention, the reenforced exposed-to-major-wear area being indicated by stippling.

Figure 2:
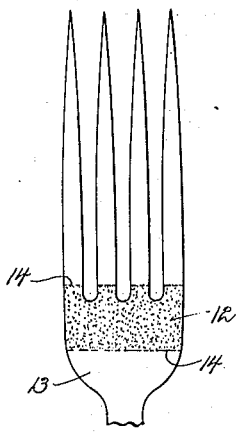

Fig. 2 a corresponding view of a fork embodying our invention.

Figure 3:
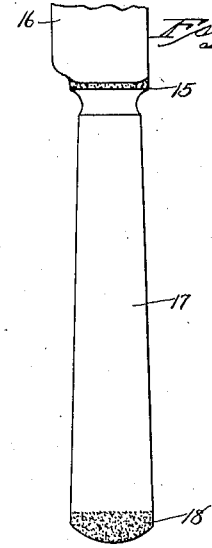

Fig. 3 a broken plan view of a knife embodying our invention.

Figure 4:
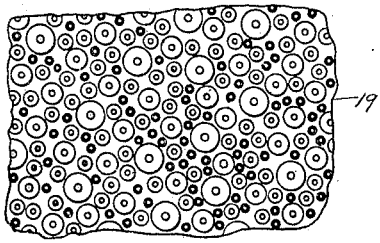

Fig. 4 a greatly magnified broken view of a portion of the exposed-to-major-wear area of the hard-metal body of a piece of flat tableware, as prepared for the reception of the silver-reenforce.

Figure 5:
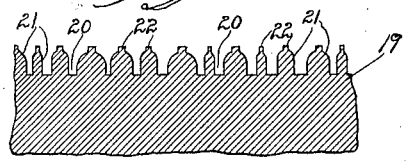

Fig. 5 a sectional view thereof.

Figure 6:
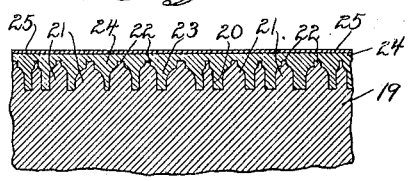

Fig. 6 a corresponding view, after the silver-reenforce has been applied, as well as the over-all silver-plating.

Figure 7:
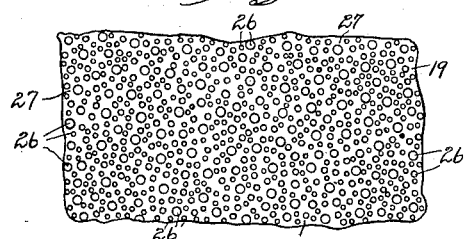

Fig. 7 a view corresponding to Figure 4, but showing another mode of preparing the exposed-to-major-wear surface of the hard-metal body of a piece of flat tableware for the reception of the silver-reenforce.

Figure 8:
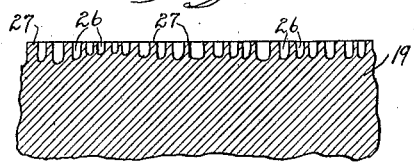

Fig. 8 a sectional view thereof.

Figure 9:
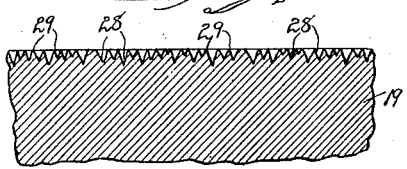

Fig. 9 a view corresponding to Figure 8, but showing another modified form of preparing the exposed-to-major-wear surface of the hard-metal body for the reception of the silver-reenforce.

Our invention relates to that class of silver-plated flat-ware for table use which has its exposed-to-major-wear area silver-reenforced under the over-all silver-plating, so that, when the plating is worn away by the abrasions of use, the silver-reenforce will prevent the exposure of the hard-metal of the body of the article, the object being to produce, at a low cost for manufacture, greatly superior flat, silver-plated tableware of the character described.

With these ends in view, our invention resides in an article of manufacture consisting of a base portion having recesses with interspersed elevations having slender terminals, a binder filling the said recesses and covering the said terminals, and a plated outside face.

Our invention further consists in certain details of construction as will be hereinafter described and particularly pointed out in the claims.

In carrying out our invention, as shown in Figure 1 of the drawings, the apex of the convex underside of the bowl 10 of an ordinary teaspoon is shown, by stippling, as provided with a triangular silver-reenforce generally designated by the numeral 11, and including what may be considered the exposed-to-major-wear area of the bowl of the spoon, the entire one-piece body of which is made of any of the standard, hard-metal alloys in common use for the purpose.

In Figure 2, a corresponding silver-reenforce 12 is shown, by stippling, as extending transversely across the apex or high point of the convex lower face of the tine-end of a fork 13. In this instance, the exposed-to-major-wear surface is included between the broken lines 14, and extends forward over the inner ends of the tines.

In Figure 3 of the drawings, the fillet 15, between the blade 16 and handle 17 of the knife, is shown as stippled to designate our improved silver-reenforce, while the tip of the handle is similarly stippled, as at 18, to show our silver-reenforce at that point, the fillet and the handle-tip being, in the case of a knife, the exposed-to-major-wear areas or surfaces.

The stippled areas thus shown by Figures 1, 2 and 3 respectively constitute the chief major wearing areas or surfaces of a spoon, fork and knife. The preparation of these areas to receive a silver-reenforce may be effected under our invention in a variety of ways. Thus, in Figures 4, 5 and 6, the exposed-to-wear surface indicated on a greatly enlarged scale by the reference numeral 19 is struck to form a plurality of closely-packed or related, intercommunicating, silver-receiving pockets 20, by preference and as shown differentiated in size and irregularly grouped and separated, each from the other, by thickly grouped, hard-metal, wear-receiving elevations 21, also differentiated in size, non-symmetrically arranged and mound-like in form, the slender nipple-like terminals or peaks 22 of these elevations being located in the same plane. The exposed-to-major-wear area 19 thus created may be viewed as consisting of a shallow silver-receiving recess coincident in area with the exposed-to-major-wear area and filled with isolated, wear-receiving elevations rising from its bottom over which they are so thickly grouped as to form, between them, a network of intersecting, silver-receiving pockets, into which the recess, considered as a whole, is divided. The wear-receiving elevations, rising in the said silver-receiving recess, occupy so much of the space thereof, that they materially reduce its silver-receiving capacity, or, in other words, the amount of silver necessary to be used in reenforcing the exposed-to-wear area. The said elevations thus discharge an economic function in reducing the amount of silver employed to the minimum. They also act as retaining-points to anchor the reenforcing mass of silver in place, particularly against the dislodging strains placed upon it in the buffing operations to which the article is subjected during the process of finishing.

The exposed-to-wear surface 19 having been prepared as described, is filled with a reenforce 23 of silver applied in any suitable manner, but preferably in a fluid state, the silver being used in sufficient amount to cover the tops of the points 22 with a sheet-like crown 24, forming, as shown in Figure 6, an integral part of the silver located in the pockets 20 and tying the pocketed silver together.

The silver-reenforce having been applied as described, the article is electroplated in the usual manner to form an over-all plate 25 of silver, whereby the reenforce of the exposed-to-wear surface is entirely covered and concealed. But it will be understood that the finishing-plate 25 may be a very light plate and no heavier than required to stand the wear in use of those surfaces not particularly exposed to wear.

Now in the use of the spoon, should the over-all silver-plating 25 wear away, the sheet-like crown 24 of the silver-reenforce 23 will be more or less exposed. However, the appearance of the spoon to the user will not be changed, as the said portion 24 of the reenforce will correspond in color to the over-all plate 25 of the spoon. Should the wear of the spoon be heavy and the crown 24 of the reenforce be also worn away, the wear-receiving terminals 22 of the base-metal of the spoon-body 10 will be exposed and take the wear and protect the wearing away of those portions of the silver-reenforce lying in the silver-receiving pockets 20.

Should any number or all of the terminals 22 be exposed in this manner, they will escape detection, except by the sharpest eye, since they are individually so small, and so embedded in the pure silver that they will not appreciably catch the light and set up contrasts of color between the base-metal and the pure silver.

Supposing that the crown 24 of the reenforce 23 to be entirely worn away, which is unlikely, the remaining portions of the reenforce will so surround the wear-receiving points 22 as to conceal the wear, despite the fact that the silver-reenforce would then be studded, so to speak, with the minute wear-receiving points 22 of the base-metal, observed under a powerful glass only as points.

By differentiating the pockets 20 and wear-receiving terminals 22 in size and adopting an irregular grouping of them, the liability of detecting the points, if exposed, is reduced, since they will then form no pattern, such as would result if the points were uniform in size and symmetrically arranged.

In the modified construction shown by Figures 7 and 8, the exposed-to-major-wear area 19 is filled, so to speak, with isolated, cup-like, silver-receiving pockets 26 differentiated in size, irregular in arrangement and separated by a wearing-surface 27 constituting the high points of what may be described as a thickly-pitted surface. The silver-reenforce is applied to this pitted surface in the manner already described, so as to have an integral, sheet-like crown 24, over which the over-all plating 25 is placed. A spoon, fork, or knife, produced in accordance with Figures 7 and 8, will function in substantially the same manner as though the exposed-to-major-wear surface were produced as shown in Figures 4, 5 and 6. Figure 9 shows the exposed-to-major-wear area 19 treated to produce a plurality of V-shaped, silver-receiving pockets 28, separated by sharp, wear-receiving points 29.

In the several embodiments of our invention shown and described, it will be seen that the exposed-to-major-wear area is formed so as to be thickly occupied by silver-receiving pockets in which the silver-reenforce is anchored, intermingled with wear-receiving points, submerged, so to speak, beneath the integral crown of the silver-reenforce and being potentially present to take the wear in case the over-all plating 25 and the crown-plate 24 are worn away. Our invention may assume a variety of forms, but in every case, there will be present a plurality of silver-receiving pockets alternating with a plurality of wear-receiving elevations, the latter being submerged beneath the crown of the silver-reenforce, and the bases of the elevations functioning to reduce the amount of pure silver required, and their points taking the wear from the body of the reenforce in case the over-all plating and the crown of the reenforce are removed by abrasion.

We claim:

1. An article of manufacture, consisting of a base portion having recesses with interspersed elevations having slender terminals, a silver binder filling the said recesses and covering the said terminals, and a plated outside face.

2. An article of manufacture, consisting of a base portion having recesses with irregularly-arranged, interspersed elevations having reduced wear resisting terminals, a binder filling the said recesses and covering the said terminals, and a plated outside face.

3. An article of manufacture comprising a base portion of hard base metal provided with a recess struck inwardly thereof at a place where major wear occurs on the article, and having hard base metal protuberances with wear resisting peaks in said recess integral with said base, a precious metal filling in said recess between and covering the protuberances and peaks thereof, and a metal plating on said base of the same characteristics as the filling in said recess.

4. An article of manufacture comprising a base portion of metal provided with a recess struck inwardly thereof at a place where major wear is wont to occur on the article, hard base metal protuberances with wear resisting peaks in said recess extending upwardly therein integral with said base, a precious metal filling in said recess between said protuberances, and a metal plating on said base and over said filling having substantially the same characteristics as the filling in said recess.

5. An article of manufacture comprising a base portion of substantially the outline of the piece, provided with a recess struck inwardly thereof at a place on the article where the major wear is wont to occur, protuberances with wear resisting peaks extending upwardly in the recess integral with said base and in spaced relation, a precious metal filling in said recess between the protuberances and providing a crown portion of shallow depth overlying the peaks of said protuberances, and precious metal plating having substantially the same characteristics in appearance and color as said filling disposed on said base and over said filling.

6. An article of manufacture comprising a base portion of inexpensive metal having a recess struck inwardly thereof at a place where wear is wont to occur in greater degree than on other portions thereof, said base having integrally connected therewith a plurality of protuberances in spaced relation outstanding in the recess of said base and formed of the inexpensive material of said base, said protuberances being relatively large at their base connecting ends, closely assembled at said base connecting ends, and their upper terminals being reduced to provide wear resisting peaks, a precious metal filling in said recess between the protuberances and over the peaks thereof, and a metal plating on said base having substantially same characteristics as to value and appearance as said filling.

7. An article of manufacture consisting of a base of inexpensive material having a recess inwardly of an area where major wear is wont to occur on the article, protuberances integral with the base extending upwardly in said recess, a precious metal filling in said recess between the protuberances and formed therein substantially contiguous with the adjacent outline of the base, and a precious metal plating for the base and filling of substantially the same characteristics in value and appearance as said filling.

In testimony whereof, we have signed this specification in the presence of subscribing witnesses.

THOMAS B. LASHAR

Witnesses:
MALCOLM P. NICHOLS,
GEORGE D. SEYMOUR.

THOMAS H. LASHAR.

Witnesses:
LOUIS GOLDMAN,
STEWART HEALY